United States Patent [19]

Baker et al.

[11] 3,930,065

[45] Dec. 30, 1975

[54] METHODS OF FABRICATING SEMICONDUCTOR DEVICES

[75] Inventors: Ian Martin Baker; John David Emrys Beynon; Peter Christopher Tudor Roberts, all of Southampton, England

[73] Assignee: National Research Development Corporation, London, England

[22] Filed: Nov. 7, 1973

[21] Appl. No.: 413,439

[30] Foreign Application Priority Data

Nov. 10, 1972 United Kingdom.............. 51950/72

[52] U.S. Cl. ...................... 427/89; 427/79; 427/90; 427/91; 427/259; 427/307; 357/24

[51] Int. Cl.² ............................................ B44D 1/18

[58] Field of Search .......... 357/24; 117/212; 427/89

[56] References Cited

UNITED STATES PATENTS

| | | | |
|---|---|---|---|
| 3,512,057 | 5/1970 | Hatcher, Jr. | 117/212 |
| 3,562,604 | 2/1971 | Van Laer | 117/212 |
| 3,738,877 | 6/1973 | Davisohn | 117/212 |

*Primary Examiner*—John D. Welsh
*Attorney, Agent, or Firm*—Cushman, Darby & Cushman

[57] ABSTRACT

A method of depositing material on a surface with narrow gaps in the deposited material at predetermined positions is described. Projections are formed in the surface and material to be deposited is projected on to the surface from a direction which casts 'shadows' of the projections where gaps are required. The method is particularly useful in making semiconductor charge-coupled devices so the material may be electrode material deposited in a vacuum by vacuum deposition. Charge-coupled devices made according to the method are also described.

18 Claims, 7 Drawing Figures

METHODS OF FABRICATING SEMICONDUCTOR DEVICES

Figure 1:
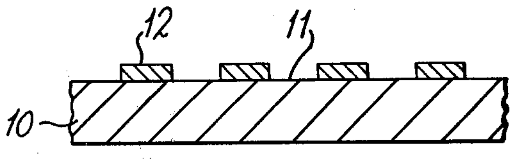

The present invention relates to the deposition of a layer of material, particularly, but no exclusively, a conducting layer forming electrodes in charge coupled devices (CCD's), and to devices having a deposited layer with narrow apertures therein.

Charge-coupled devices depend, for their operation, on a series of closely-spaced parallel electrodes grown or deposited on a semiconductor substrate. The inter-electrode gap must be very small, about 3$\mu$m or less to obtain CCD action. Gaps of less than 1$\mu$m are very difficult to fabricate by conventional photolithographic techniques: indeed it is very difficult to fabricate structures with gaps smaller than 2 or 3$\mu$m.

The operation and construction of some types of CCD are described in a paper "The New Concept For Memory And Imaging: Charge Coupling" by L. Altman, "Electronics," Vol. 44, 13, page 50, 21 June, 1971. Basically CCD's are shift registers in which a charge under one electrode can be transferred to another electrode by the application of external voltages to the electrodes. The electrodes are connected in groups to simplify the way in which voltages are applied, and electrodes in each group are separated by electrodes from other groups.

According to a first aspect of the present invention there is provided a method of depositing a layer of material with small apertures in the layer, including forming a surface having a number of projections, each projection being adjacent to the desiried position of an aperture associated therewith to be formed in a layer to be applied to the surface, and each projection being in the same position in relation to the desired position as the other such projections are in relation to the desired positions of their associated apertures, and coating the surface at least in the region of the desired apertures and ajdacent regions to form the layer using a process in which material is incident upon the surface from a direction in which the incident material casts shadows forming the required apertures where the projections prevent material from reaching the surface.

CCD devices made using this method employ a semiconductor slice or wafer usually coated with an insulator, and it is required to deposit electrodes forming the said layer on the insulator with narrow gaps between the electrodes. In forming the said surface insulating material may first be deposited, for example by the growth of an oxide to a thickness comparable with the required inter-electrode gap size over the area in which the gaps between electrodes are to occur. Subsequently depressions which may extend through the insulating material to form gaps are etched in the insulating material in positions where one edge of each gap or depression corresponds to the desired position of an inter-electrode gap. The insulating mamterial is now again grown or deposited over the area of interest with the result that an insulator with a surface having projections adjacent to the desired positions of the inter-electrode gaps is formed. This surface is now coated for example by vacuum evapaoration or sputtering from a source of conducting material which provides a beam of atoms having a longitudinal axis which is at an angle preferably between 10° to 80° to the plane of the slice or wafer.

In this way the shadows cast can easily be made to form gaps considerably less than 1$\mu$m wide between the electrodes, for example a 9 bit CCD shift register with 0.2$\mu$m gaps has been made. The very small gaps made possible by this technique are conducive to good CCD action - high transfer efficiency with relatively low electrode voltages. The way of making CCD devices much more compact and faster in operation, two very desirable goals in many CCD applications, is also opened up.

Instead of forming the grooves or depressions in the insulating material, they may be formed in the conducting material. In this case the insulating material is not etched after growth or deposition but, after a uniform conducting layer has been deposited on the insulating material, it is the conducting layer which is etched until gaps are formed in positions where one edge of each gap or depression corresponds to the desired position of an inter-electrode gap. At this stage a further coating is carried out with the same or a different conducting material using a beam of atoms which casts shadows at the edges of projections formed by the unetched conducting material.

In some CCD devices the insulating layer is not required, in which case depressions can be formed by etching the semi-conductor, or by depositing conducting material directly on to the semi-conductor and then etching gaps in this material.

According to a second aspect of the invention there is provided a semi-conductor device, comprising a body of semi-conductor material, and a pattern of conducting material formed on a surface having projections, the pattern forming electrodes and interconnections with gaps existing in the conducting material between electrodes and the gaps having been formed during deposition of the conducting material by shadows cast from the projections by a beam of conducting material incident on the said surface.

The said surface may for example be that of the semi-conductor material, or that of a layer of insulating material on the semi-conductor material, or it may be a composite surface formed by projections of conducting material on the semi-conductor material or on a layer of insulating material.

The projections are preferably parallel ridges with the result that the electrodes and the gaps have opposite sides parallel.

Where the projections are formed in a layer of insulating material, each electrode is separated from the semi-conductor slice by two regions of insulating material of different thicknesses. Such a device has advantages as a shift register since, as is explained below, it allows operation in a "two-phase" mode and is more compact.

For a CCD, the semi-conductor may for example be silicon, or germanium or gallium arsenide. Any compatible insulating material such as silicon dioxide or silicon nitride may be used, and the conductor may for example be aluminium, or gold or nichrome or a refractory metal such as molybdenum, or some combination of these conductors. It is expected that polysilicon could also be used as the conducting material.

Figure 2:
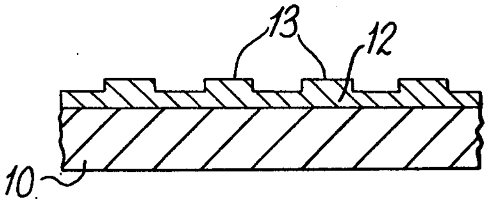
Figure 3:
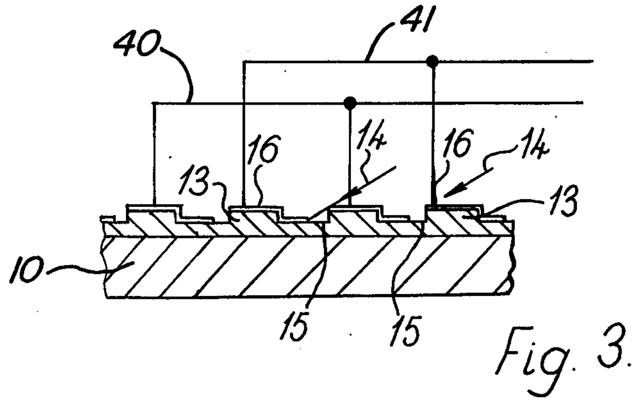

Certain embodiments of the invention will now be described by way of example, with reference to the accompanying drawings, in which:

FIGS. 1 and 2 are cross-sections showing intermediate stages in making a CCD using a method according to the invention in which projections are formed in an oxide layer, FIG. 3 shows the final stage in making a CCD, in which a beam of aluminium atoms is directed on to the partially fabricated device shown in FIG. 2.

Figure 4:
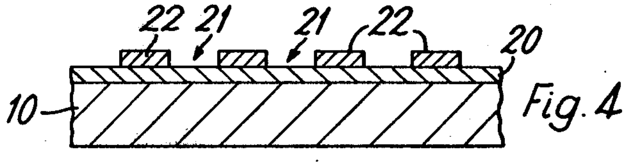
Figure 5:
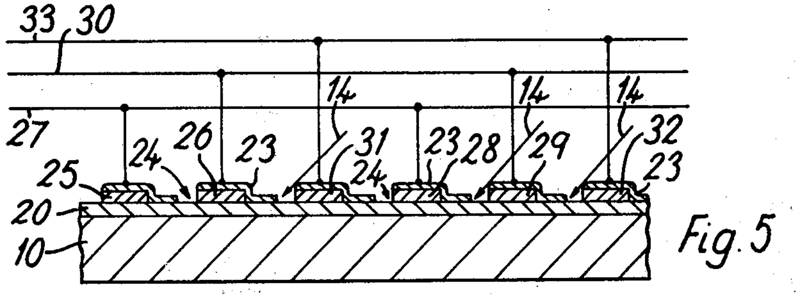
Figure 6:
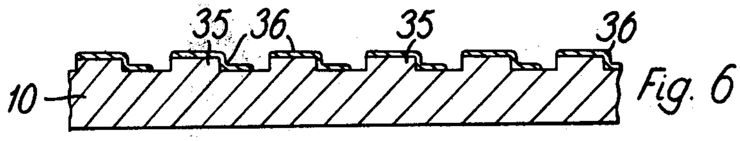
Figure 7:
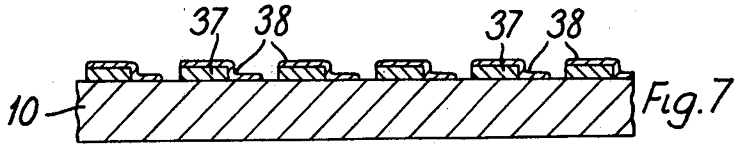

FIG. 4 is a cross-section showing an intermediate stage in making a CCD using a method according to the invention in which projections are formed of conducting material on an oxide layer, FIG. 5 shows the final stage in making the CCD of FIG. 4, FIG. 6 shows a further CCD according to the invention in which projections are formed in silicon, and FIG. 7 shows another CCD device according to the invention in which projections are formed from a conducting material.

In making a CCD an insulating layer of silicon dioxide of thickness about 0.3$\mu$m is grown or deposited on a silicon slice 10. Parallel grooves 11 are then etched in the oxide 12 to expose the silicon as shown in FIG. 1. One edge of each groove is positioned to be coincident with a gap to be formed between electrodes. A second layer of silicon dioxide is now grown or deposited on the first layer. A structure whose cross-section is shown in FIG. 2 is obtained with projections in the form of parallel ridges 13. The deposition or growth of the silicon dioxide is carried out using conventional techniques well known in semi-conductor technology, such as those described in "Fundamentals of Silicon Integrated Device Technology," Vol. 1, Ed. by R. M. Burger and R. P. Donovan, Prentice Hall, 1967 particularly Ch. 2 "Methods of oxide formation," pp. 36 – 105. The etching of the silicon dioxide is also carried out by conventional techniques such as those described in "Integrated Circuits — Design Principles and Fabrication," Ed. R. M. Warner, Jr., and J. N. Fordemwalt, McGraw-Hill, 1965, particularly pp. 150 – 153; and also "The Theory and Practice of Microelectronics" by S. K. Ghandi, Wiley, 1968, particularly pp. 162 – 166.

The silicon slice is now placed in an evaporation unit and aluminized in the conventional way (such as is described in "Integrated Circuits — Design Principles and Fabrication," Ed. R. M. Warner, Jr., and J. N. Fordemwalt, McGraw-Hill, 1965, particularly p. 309) except that the aluminum source, which is usually a small quantity of aluminum on a tungsten heater, is so positioned that a line joining the source and the center of the slice is at an angle of about 45° to the plane of the slice. In FIG. 3 the arrows 14 represent the incident path of aluminum atoms, and it can be seen that shadows 15 are cast by the projections 13 where no aluminum is deposited. It is these shadows which cause the required narrow gaps between the electrodoes to be formed as a layer 16 of aluminum is deposited.

In this way a layer of aluminum is deposited on the slice except where gaps are left by the shadow cast. It is now necessary to remove this layer except where connections and electrodes are required. The removal of unwanted metal is carried out using a mask and conventional photolithographic techniques such as those described above in connection with etching silicon dioxide.

The aluminum used is at least 99.99% pure and the air pressure in the vacuum chamber less than $2 \times 10^{-5}$ torr. The minimum satisfactory thickness of aluminum is 500A.

The definition and reproducibility of the gaps can be improved by increasing the collimation of the beam of incident atoms. In the case of an evaporated metal like aluminum, this can be achieved by inserting one or more apertures between the source and the slice. For a sputtered metal such as molybdenum a special configuration of electric and/or magnetic fields may be used to improve the collimation.

By varying the thickness of the two layers of silicon dioxide deposited and the angle of incidence of the beam of aluminum atoms the gaps can be varied and extremely small inter-electrode gaps can be made.

By forming a CCD in the way specially described, each electrode is separated from the silicon by two different thicknesses of oxide. Such a CCD has the additional advantage that it can be operated in a two-phase mode rather than a three-phase mode. Briefly this means that where alternate electrodes are connected together in a first group by means of a connection 40 (see FIG. 3), and the remaining electrodes are connected in a second group by means of a connection 41, then charge (that is electrons or holes according to as to whether the semi-conductor is p- or n-type, respectively) can be transferred from a first electrode in the first group to an adjacent second electrodoe in the second group. This transfer is carried out by applying a voltage to the second group of electrodes which forms a potential well under the second electrode capturing charge from the first electrode. Charge can then be trnsferred to a third electrode in the first group by creating a potential well under the third electrode and removing or reducing the voltage applied to the second group of electrodes. Charge is not transferred back to the first electrode because the potential well under the second electrode is asymmetric and is conducive to charge flow in only one direction (from left to right in FIG. 3). The asymmetrical potential well results from the two thicknesses of oxide separating each electrode from the semi-conductor.

In another embodiment of the invention now described with reference to FIGS. 4 and 5, a uniformly thick layer of silicon dioxide is grown on the silicon 10 using the techniques already mentioned. A uniform aluminum layer is then deposited, also by conventional techniques already mentioned, on the layer 20 and is etched to expose the silicon dioxide in forming a series of parallel grooves 21 shown in cross-section in FIG. 4. Thus parallel sided aluminum ridges 22 shown end on in FIG. 4 are formed.

A further layer 23 (see FIG. 5) of aluminum or another conductor is now deposited using a beam of atoms represented by arrows 14 at an angle to the layer 20. As a result narrow gaps 24 are formed by shadows between the areas of conducting material. As in the previously described embodiment the defination of the gaps can be improved by collimating the beam casting the shadows.

The device of FIG. 5 is suitable for three phase not two phase operation. Every third electrode is connected together with intervening electrodes connected in the same way. Thus electrodes 25 and 28 are connected by a connection 27, electrodes 26 and 29 are connected by a connection 30 and electrodes 31 and 32 by a connection 33. The electrodes 25 and 28, 26 and 29, and 31 and 32 are part of series of electrodes extending to the right and left of FIG. 5 and connected in the same fashion.

To transfer charge held for example beneath the electrode 25 by a voltage applied to the connection 27 which is greater in magnitude than that applied to the connections 30 and 33, the voltage applied to the connection 30 and thus to the electrode 26 is made the same as that of the electrode 25. As a result some of electrons held under the electrode 25 move to a position under the electrode 26 without any tendency to move on to the electrode 31 or back to the left of the electrode 25. The voltage applied to connection 27 is now reduced to the same value as that of the connection 33 and the remainder of the electrons move under the electrode 26. By applying to the connection 33 a voltage which is equal in magnitude to that of the connection 30 and then reducing the voltage of the connection 30 the charge can be made to move on to a position under the electrode 31. Similar voltage changes move the charge along to positions under further electrodes in the series.

As has been mentioned the oxide layer is not always required and a CCD suitable for three phase operation is shown in FIG. 6 where a semi-conductor 10 has been etched to provide projections 35 and conducting material 36 has been laid down by the shadow technique to provide electrodes. In FIG. 7 the projections 37 were formed by depositing a uniform layer of conducting material and etching grooves as described in connection with FIG. 4. More conducting material 38 was then deposited using the shadow technique. The device of FIG. 7 is suitable for three phase not two phase operation.

In the structures of FIGS. 6 and 7 electrical insulation between the metal and semi-conductor is provided by a Schottky barrier at the metal semi-conductor interface.

It will be apparent that there are many ways of carrying out the invention other than that specifically described. For example various other materials such as those already mentioned can be used, and the layout of the electrodes and interconnections may be different. The angle between the line joining the source to the centre of the slice may be varied. Furthermore different steps may be used in arriving at the final product, for example in a CCD the first deposited oxide layer may be much thicker and this thick layer may be partially etched away in places to form the projections, and as a further example the interconnections may be laid down in a separate stage of the process rather than at the same time as the electrodes with their separating gaps.

We claim:

1. A method of making a charge-coupled device having an ordered array of electrodes, including the steps of:

forming a surface layer for a body of semi-conductor material, the surface layer being of material other than conducting material and having an ordered array of projections thereon, each projection being associated with one of the desired electrodes particular thereto, and depositing conducting material permanently on the said surface, at least in a region containing the said projections, to form the said electrodes, wherein the incident material casts shadows from the projections forming gaps between the electrodes where the shadows occur, the shadowed area being essentially devoid of deposited conducting material.

2. The method of claim 1 wherein the deposited conducting material forms part of the electrodes and interconnections of the device.

3. The method of claim 2 wherein each electrode has two portions integral with one another, one portion extending over the associated projection, provided that where part of the surface of a projection falls in shadow part of one of the said gaps occurs, and the other portion extending over the surface layer between the associated projection and an adjacent projection, provided that where part of the surface layer between the associated projection and the adjacent projection falls in shadow part of one of the said gaps occurs.

4. A method of making a semi-conductor device according to claim 1, including providing insulating material on the semi-conductor material in forming the said surface layer, and forming the said projections by etching depressions in the insulating material.

5. A method according to claim 4 wherein etching is carried out until the depressions are in the form of gaps in the insulating material, and, after etching, further insulating material is deposited over the etched insulating materials and the said gaps therein.

6. A method of making a semi-conducting device according to claim 1 including etching depressions in the body of semi-conductor material to form the said surface layers.

7. A method according to claim 1 where the projections are each substantially rectangular in cross-section with one surface of each projection in substantially the same plane as the corresponding surfaces of the other projections, and the material casting shadows is incident on the said surface along a beam of material having a longitudinal axis which is at an angle of between 10° to 80° to the said plane.

8. A method of making a charge-coupled device according to claim 1 wherein the projections define a plurality of parallel grooves and the deposition of conducting material is carried out by vacuum deposition over the whole area over which the grooves extend except for those parts of the area containing the ends of the grooves, to form electrodes each of which has two contiguous portions, one portion extending over the associated projections, except on that part of the projection forming part of one of the said gaps, and the other portion extending over the surface layer between the associated projection and an adjacent portion, except where part of another of the said gaps is formed.

9. A method of making a charge-coupled device according to claim 4 wherein the projections define a plurality of parallel grooves and the deposition of conducting material is carried out by vacuum deposition over the whole area over which the grooves extend except for those parts of the area containing the ends of the grooves, the projections are each substantially rectangular in cross-section with one surface of each projection in substantially the same plane as the corresponding surfaces of the other projections, and the material casting shadows is incident on the said surface along a beam of material having a longitudinal axis which is at an angle of between 10° to 80° to the said plane.

10. A method according to claim 9 wherein the etching is carried out until the depressions are in the form of gaps in the insulating material, and further insulating material is deposited after etching.

11. A method according to claim 10 including depositing a uniformly thick layer of insulating material on the planar surface before the layer of conducting material is deposited.

12. A method of making a charge-coupled device according to claim 6 wherein the projections define a plurality of parallel grooves and the said coating is carried out by vacuum deposition over the whole area over which the grooves extend except for those parts of the area containing the ends of the grooves.

13. A method according to claim 4 wherein the semiconductor material is chosen from the group comprising silicon, germanium, and gallium arsenide.

14. A method according to claim 4 wherein the semiconductor material is silicon and the insulating material is chosen from the group comprising silicon dioxide and silicon nitride.

15. The method of claim 9, wherein the deposited conducting material forms part of the electrodes and interconnections of the device, and each electrode has two portions integral with one another, one portion extending over the associated projection, provided that where part of the surface of a projection falls in shadow part of one of the said gaps occurs, and the other portion extending over the surface layer between the associated projection and an adjacent projection, provided that where part of the surface layer between the associated projection and the adjacent projection falls in shadow part of one of the said gaps occurs.

16. The method of claim 12, wherein the deposited conducting material forms part of the electrodes and interconnections of the device, and each electrode has two portions integral with one another, one portion extending over the associated projection, provided that where part of the surface of a projection falls in shadow part of one of the said gaps occurs, and the other portion extending over the surface layer between the associated projection and an adjacent projection, provided that where part of the surface layer between the associated projection and the adjacent projection falls in shadow part of one of the said gaps occurs.

17. The method of claim 15 wherein the said interconnections include connections connecting the electrodes in two groups, a first group in which alternate electrodes are connected together, and a second group in which the remaining electrodes are connected together.

18. The method of claim 16 wherein the said interconnections include connections connecting the electrodes in two groups, a first group in which alternate electrodes are connected together, and a second group in which the remaining electrodes are connected together.

* * * * *